United States Patent
Myr (10) Patent No.: US 9,292,987 B1
(45) Date of Patent: Mar. 22, 2016

(54) SYSTEM AND METHOD FOR FULLY ENCRYPTED REMOTE WEB-BASED VOTING

(71) Applicant: Makor Issues and Rights Ltd., Jerusalem (IL)

(72) Inventor: David Myr, Jerusalem (IL)

(73) Assignee: Makor Issues and Rights, Ltd., Jerusalem (IL)

( * ) Notice: Subject to any disclaimer, the term of this patent is extended or adjusted under 35 U.S.C. 154(b) by 0 days.

(21) Appl. No.: 14/492,296

(22) Filed: Sep. 22, 2014

(51) Int. Cl.
*G06K 17/00* (2006.01)
*G07C 13/00* (2006.01)
*H04L 29/06* (2006.01)
*H04L 9/32* (2006.01)

(52) U.S. Cl.
CPC .............. *G07C 13/00* (2013.01); *H04L 9/3226* (2013.01); *H04L 63/0428* (2013.01); *H04L 63/0442* (2013.01)

(58) Field of Classification Search
CPC .............. G07C 13/00; G07C 9/00039; H04L 63/0442; H04L 9/3226; H04L 2209/463
USPC ........................................................ 235/386
See application file for complete search history.

(56) References Cited

U.S. PATENT DOCUMENTS

| | | | |
|---|---|---|---|
| 6,871,278 B1 * | 3/2005 | Sciupac ........................ 713/185 |
| 7,152,156 B1 | 12/2006 | Babbitt et al. |
| 7,597,258 B2 | 10/2009 | Feldkamp et al. |
| 7,757,950 B2 | 7/2010 | Seliger et al. |
| 2004/0024635 A1 * | 2/2004 | McClure et al. ................. 705/12 |
| 2005/0021479 A1 * | 1/2005 | Jorba et al. ........................ 705/67 |
| 2006/0004641 A1 * | 1/2006 | Moore et al. ..................... 705/26 |
| 2006/0041514 A1 * | 2/2006 | Bogasky ................ G07C 13/00 705/64 |
| 2007/0246534 A1 * | 10/2007 | Feldkamp et al. ............. 235/386 |
| 2009/0307065 A1 * | 12/2009 | Kincaid ........................... 705/12 |
| 2010/0241493 A1 * | 9/2010 | Onischuk ......................... 705/12 |
| 2013/0006719 A1 * | 1/2013 | Green et al. ..................... 705/12 |
| 2014/0044261 A1 * | 2/2014 | Massimo ...................... 380/255 |
| 2014/0224872 A1 * | 8/2014 | Griggs .......................... 235/380 |

OTHER PUBLICATIONS

Simply Voting, www.simplyvoting.com, 2014 Simply Voting Inc.

* cited by examiner

*Primary Examiner* — Thien M Le
*Assistant Examiner* — Claude J Brown
(74) *Attorney, Agent, or Firm* — Caesar Rivise, PC

(57) ABSTRACT

The presented invention discloses an electronic web-based election system and method for fully encrypted secure remote voting, wherein the voting data is fully encrypted, including within-the-database encryption, until the end of voting time period. Further disclosed a computer encryption system, wherein the voting result encryption application is additionally installed, such a system being configured to obtain encrypted voting results data and send such a data as a ciphertext to the election central server for encrypted ciphertext storage in the database to prevent everybody, including database administrators, from viewing the data. Method for secure data encryption and public keys computation based on voter's secret PIN code is further presented.

9 Claims, 6 Drawing Sheets

Fig 3 encryption

Fig 5 encryption

SYSTEM AND METHOD FOR FULLY ENCRYPTED REMOTE WEB-BASED VOTING

FIELD OF THE INVENTION

The present invention relates to electronic voting systems and methods and, more particularly, to a secure innovative system and method for conducting secure individually fully-encrypted elections and voting polls through the Internet.

BACKGROUND OF THE INVENTION

A number of systems for remote electronic voting were tested in the recent years. Maximal security, which is absolutely necessary for the reliable electronic voting, has been and still is a major issue in the remote electronic voting.

Examples of such remote electronic voting can be found in several countries. Prime examples include: parliamentary elections in Australia and Estonia. Those elections were conducted successfully and can provide a solid case for implementing similar systems in other countries.

Electronic voting in Estonia began in October 2005 local elections when Estonia became the first country to have legally binding general elections using the Internet as a means of casting the vote and was declared a success by the Estonian election officials.

In September 2000, the European Commission launched the CyberVote on-line elections project with trials performed in Sweden, France, and Germany.

In Australian, the electronic voting was introduced to execute voting for military personnel stationed out of Australia, for example.

There is a Simply Voting web-based online voting system for managing online election. Voters arrive at voting website, authenticate their identity and vote. Voting results are kept anonymous. The voter is issued a receipt and is now blocked from voting for this election again.

In addition, there are several US patent references in the remote electronic voting field.

U.S. Pat. No. 7,757,950 presents election system enabling coercion-free remote voting wherein a remote voter transmits his/her selected vote to the election authority through a data transmission network such as the Internet network by using a host computer having a card reader, the vote being transmitted after the voter has introduced an identifying smart card into the card reader. At least one secret code is recorded into the smart card at the location of the election authority at the moment when the latter delivers the smart card, the secret code having to be input by the voter into the host computer when the voter wants to vote during an election in order for the vote to be transmitted to the election authority and validated by the election authority.

U.S. Pat. No. 7,597,258 by Feldkamp titled: "Confidential electronic election system" provides a system for improved elections which may separate the identity of the voter from the content of the vote she casts. The system may be implemented using electronic or other communication methods. The system is implemented in a separation of voter information from information in the members' votes, to comply with various government regulations relating to elections.

U.S. Pat. No. 7,152,156 by Babbitt titled: "Secure internet voting system with bootable disk provides" discloses an Internet voting system with security against malicious software by using a bootable CD-ROM to boot voter client machines for use in elections. The invention discloses a secure program storage device bearing program instructions operable for booting a computer by exclusive execution of program instructions found only on the storage medium at the computer and the exclusive execution of program instructions excepting system device drivers as needed for operation of the computer; the program instructions on the storage medium being further operable for execution of a voting application program configured to permit a voter to cast votes in an election.

The currently presented electronic voting systems, as well as other currently existing encryption methods, such as SSL do not provide fully encrypted data in the database, therefore network and database administrators will be able to view the data. Our invention presents a system wherein the data in the voting database is encrypted, so to prevent network and database administrators from viewing the data. Further, a new method of secure encryption is disclosed in our invention.

One additional problem in current voting process is a situation of "double voting". An example of "double voting" is when Democrats in USA are voting for a certain Republican candidates for primaries in addition to voting in the Democratic primary.

To fix this problem, in our invention, the preferences would flow down the list of the candidates of the party they first chose and then move on to the list of candidates of the party of their second choice, and so on.

One additional advantage of the invention is in eliminating the need in all sort of election polls which are normally conducted before the elections results become public in a few hours time after election time period is ended.

REFERENCES CITED

U.S. Pat. No. 7,152,156
U.S. Pat. No. 7,597,258
U.S. Pat. No. 7,757,950
Simply Voting system www.simplyvoting.com

DETAILED DESCRIPTION OF THE INVENTION

In the following discussion, numerous specific details are set forth to provide a thorough understanding of the present invention.

Other features and advantages of the present invention will be apparent from the following description taken in conjunction with the accompanying drawings, in which like reference characters designate the same or similar parts throughout the figures thereof.

The present invention discloses a new system and method for remote electronic web-based voting using secure individually encrypted network for each voter, when each vote remains individually encrypted from the time of the vote and until being decrypted by the election committee trustees at the end of voting time period.

In the real world situation, it is reasonable to assume that there will be a percentage of voters who prefer voting through the regular paper-based polling station network. For that the invented system further includes a polling station based system comprised of one of more computers interactively connected to the election central server computer, such computers containing a total list of voters for the said polling station, a list of voters who already voted either by using web-based invented system or by using a polling station.

The new proposed system and method keeps highest levels of precision, security and confidentiality of the existing voting methods while having a number of main advantages such as:
1. Significant monetary saving in elections process, since there is no need to open ballot stations;
2. Savings in working man-hours since there will be no need to take a day off for the elections;
3. Fully encrypted from the start to the end of the voting process and voting time period;
4. Using existent technology and equipment;
5. Increasing voting turnout;
6. Easy to implement;
7. Election results will be calculated quickly while eliminating human error factor.

The proposed secure web-based election system aims to fulfill the following main requirements:
1. Security—the aim is to achieve more security that traditional paper-based elections. To ensure high level of security and confidentiality, there will be two non-connected servers in the proposed system and two non-connected databases.
    Communication between the voter's computer and our website is encrypted with the highest level of protection.
2. Privacy—all votes remain secret, no one is able to gain information about a voter's vote;
3. Only eligible voters are allowed to cast votes, while every vote can be made only once.
    Additionally, votes are strictly checked for validity before being accepted;
4. Election observers can check the election results and election results calculations;
5. Working on most OSs and platforms, such as Windows, Linux, Android, Ios, Windows Mobile.

The invented system could be used also for conducting secure encrypted electronic web-based voting polls when the voting polls participants' number and quality are selected according to statistical sample selection principles. Such polls should have an advantage over existing polls in encryption of the results and strong statistical precision and validity of it.

Figure 1A:
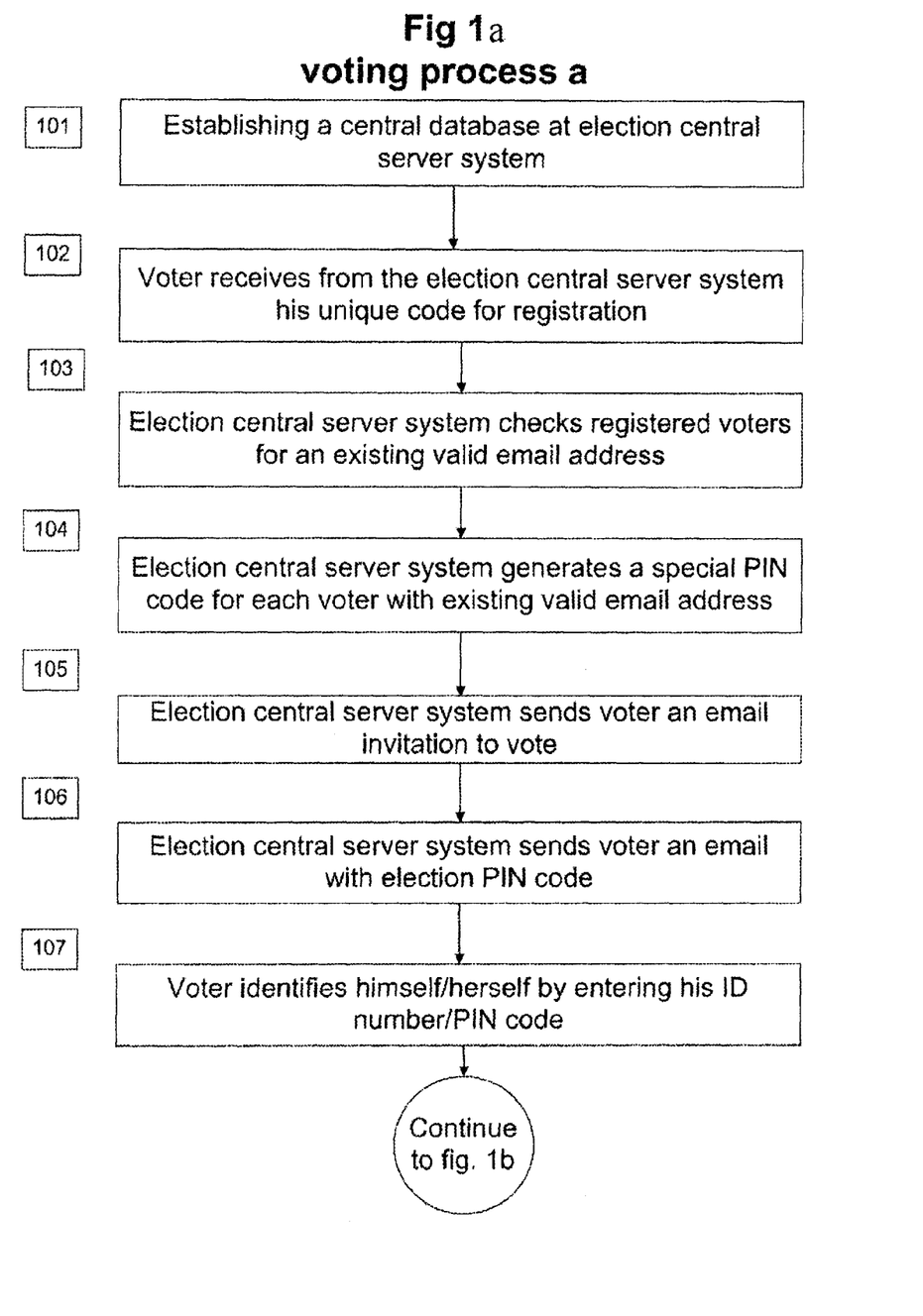
FIG. 1a and FIG. 1b graphically represent stages of remote electronic voting process in the invention.
Figure 1B:
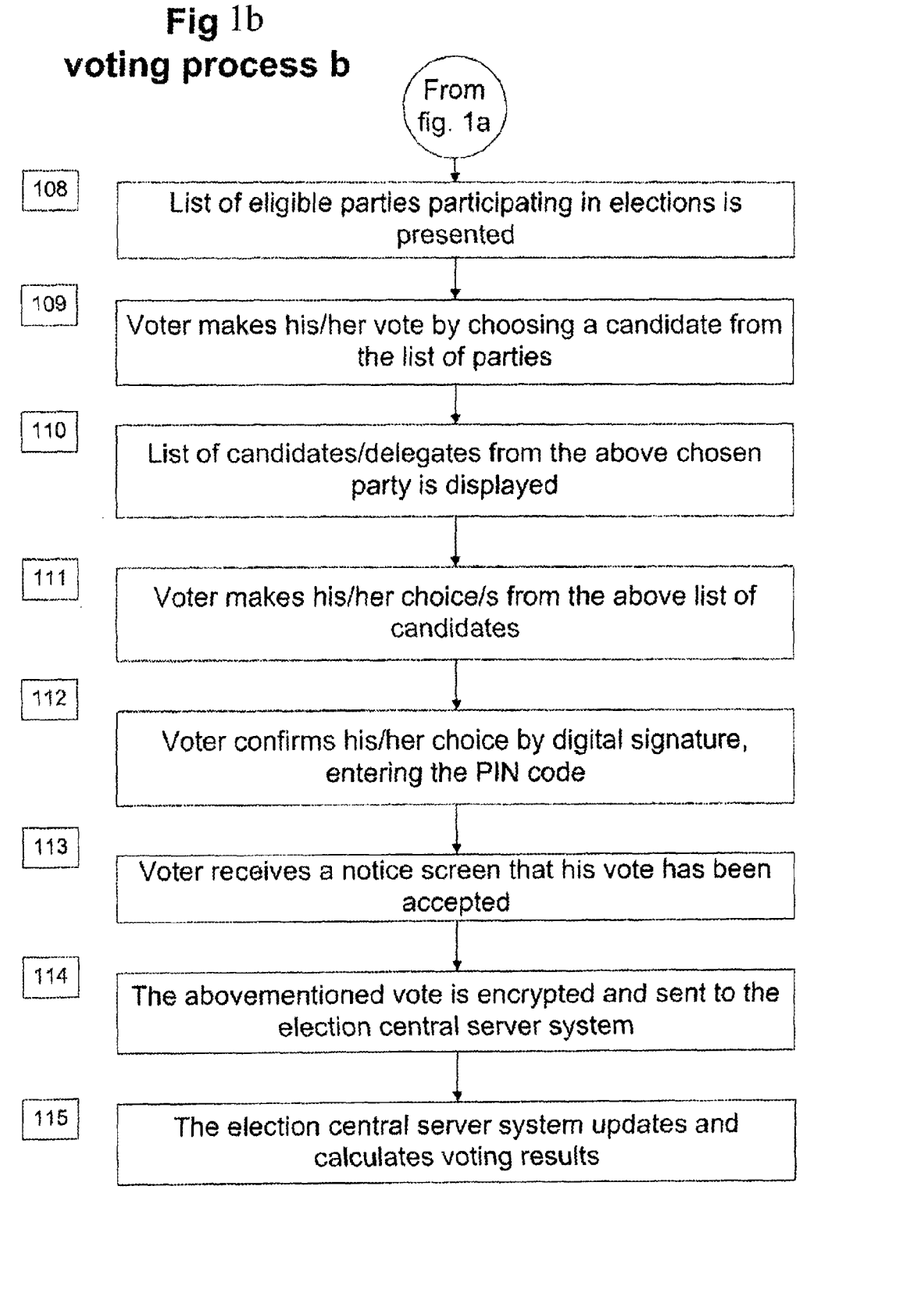
Figure 4:
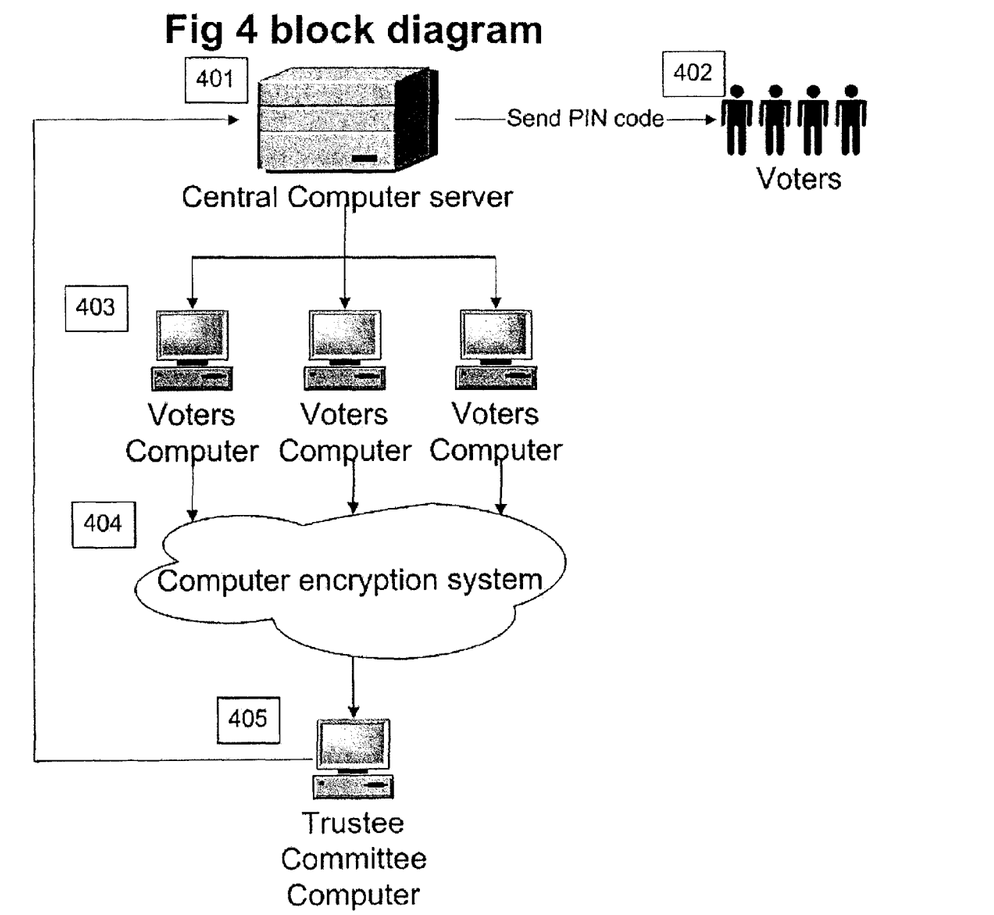
FIG. 4 is a block diagram which illustrates an exemplary apparatus for voting with encryption.

FIG. 1a and FIG. 1b graphically represent stages of remote electronic voting process in the invention. FIG. 4 is a block diagram which illustrates exemplary apparatus for voting with encryption. Those stages depicted in FIG. 1a and FIG. 1b consist of the following:
1. Establishing a central elections database at election central server (401) system (101).
    Such a server computer system being configured to:
    send to the voter 402 his unique code for registration in central voting database, such registration includes entering his email address into the voting database;
    check for each voter registered in the system for an existing valid email address;
    generate a special PIN code for each voter registered in the system having an existing valid email address;
    sends to the voter regular post mail with PIN code required for entering for a valid election;
    send to the voter 402 an email invitation to vote;
    authenticate each voter accessing the elections services computer system by authenticating his PIN code and ID data;
    obtain and store the voting results data as a ciphertext in the database;
    calculate elections results when the election time period is over;
    update election central server system votes results.
2. Voter receives from the election central server system his unique message for registration in central voting database, such registration includes entering his email address into the voting database (102). On this stage, the voter has an option to update, add or delete his email address for voting.
3. The election central server system checks for each voter registered in the system for an existing valid email address (103);
4. The election central server system generates a special unique PIN code for each voter registered in the system having an existing valid email address (104).
5. The election central server system sends to the voter an email invitation to vote (105);
6. The election central server system sends a voter his unique PIN code for validly participating in the elections (106). In the preferred embodiment of the invention, the election committee will produce a PIN mailer for each eligible voter. The PIN will be used to authenticate an elector's identity as part of the voting process.
    The PIN mailer comprised a letter with a security panel which, when peeled off, revealed the voter's PIN. The letter also contained instructions to the voter on how to vote.
    In another embodiment of the invention, the PIN code mailing can be done also by email or by SMS to voter' registered email address/phone number. Emails of registered voters will be registered in Ministry of Interior. For emails registration, several courses of action can be taken. The person when applies for a new passport/ID/change of address will mention his email in the forms.
7. Voter opens email/specially designed secure voting website. Voting message will be used only once. So, if the voter already made his vote, he will not be able to download the message or vote again.
8. Voter identifies himself/herself by entering his ID number, PIN code (107) and the system will authenticate each voter accessing the elections services computer system by authenticating his PIN code and ID data;
9. Consolidated list of parties eligible for elections shall be displayed to the voter on the computer screen 403 (108);
10. Voter makes his/her vote by choosing a party from the abovementioned list of parties (109);
11. Consolidated list of candidates shall be displayed to the voter on the computer screen 403 (voter will only be able to vote for the candidates from the particular party that he already voted for at the previous first stage of voting) (110);
12. Voter makes his/her choice/s from the list of available candidates from the party he already selected (111). The voter will be able to vote only for candidates for the same party that he voted. That means there is no need in primaries elections. Every delegate who will be able to produce a minimum number of votes will make an initial list of candidates.

13. Voter confirms his/her choice by digital signature, entering the PIN code (112);
14. Voter receives a notice screen that his vote has been accepted (113);
15. The abovementioned vote is encrypted via computer encryption system 404 and sent to the election central server system (114). Votes are encrypted from the beginning of individual voter voting process till the end of election time period. Additionally, voting is performed anonymously, i.e. it is made without knowing the contents as it is impossible to connect the vote to the voter.

There is a group of trustees having the decryption keys in trustee committee computer 405 such keys will be used at the end of voting time period.

Data will be stored in an encrypted form within the database. Such a database can be MS SQL in one embodiment of the invention.

To hide data from the database administrators, then regular database such as MS SQL Server are not equipped to deal with that problem, since data will not have encryption of any kind in the database. In that case the client application should be encrypting data and storing the ciphertext in the database. That way neither the database server nor the database administrators (nor the network administrators, as well) ever see unencrypted data or encryption keys. So, to prevent gaining access to sensitive data, consider encrypting at the application level and protect the encryption keys accordingly.

Full encryption until the end of the voting process means that even the election committee employees will not be able to see the voting results until the end of voting time period.
16. The election central server system updates and calculates voting results (115).

Figure 2:
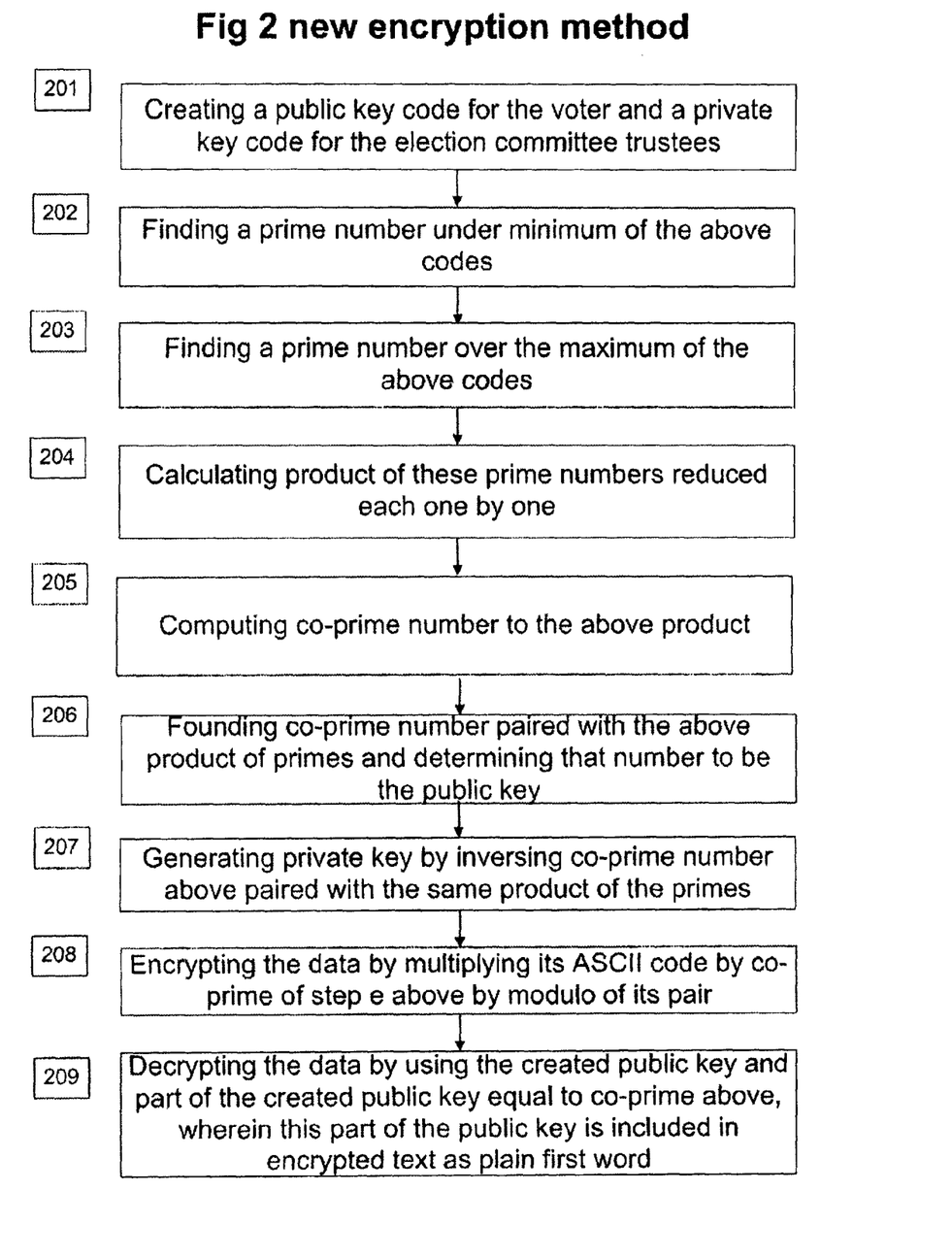
FIG. 2 illustrates a new method for secure data encryption and public keys computation.

FIG. 2 illustrates a new method for secure data encryption and public keys computation based on voter's secret PIN code sent to him by the election committee trustees, is presented, the method comprising the following steps:

1. Creating a public key code for the eligible voter and a private key code for the election committee trustees (201);
2. Finding a prime number under minimum of the above codes (202);
3. Finding a prime number over the maximum of the above codes (203);
4. Calculating product of these prime numbers reduced each one by one (204);
5. Computing co-prime number to the above product (205);
6. Founding co-prime number paired with the above product of primes and determining that number to be the public key (206);
7. Generating private key by inversing co-prime number above paired with the same product of the primes (207);
8. Encrypting the data by multiplying its ASCII code by co-prime of step e above by modulo of its pair (208);
9. Decrypting the data encrypted in step h above by using the created public key and part of the created public key equal to co-prime of step e above, wherein this part of the public key is included in encrypted text as plain first word (209).

Figure 3:
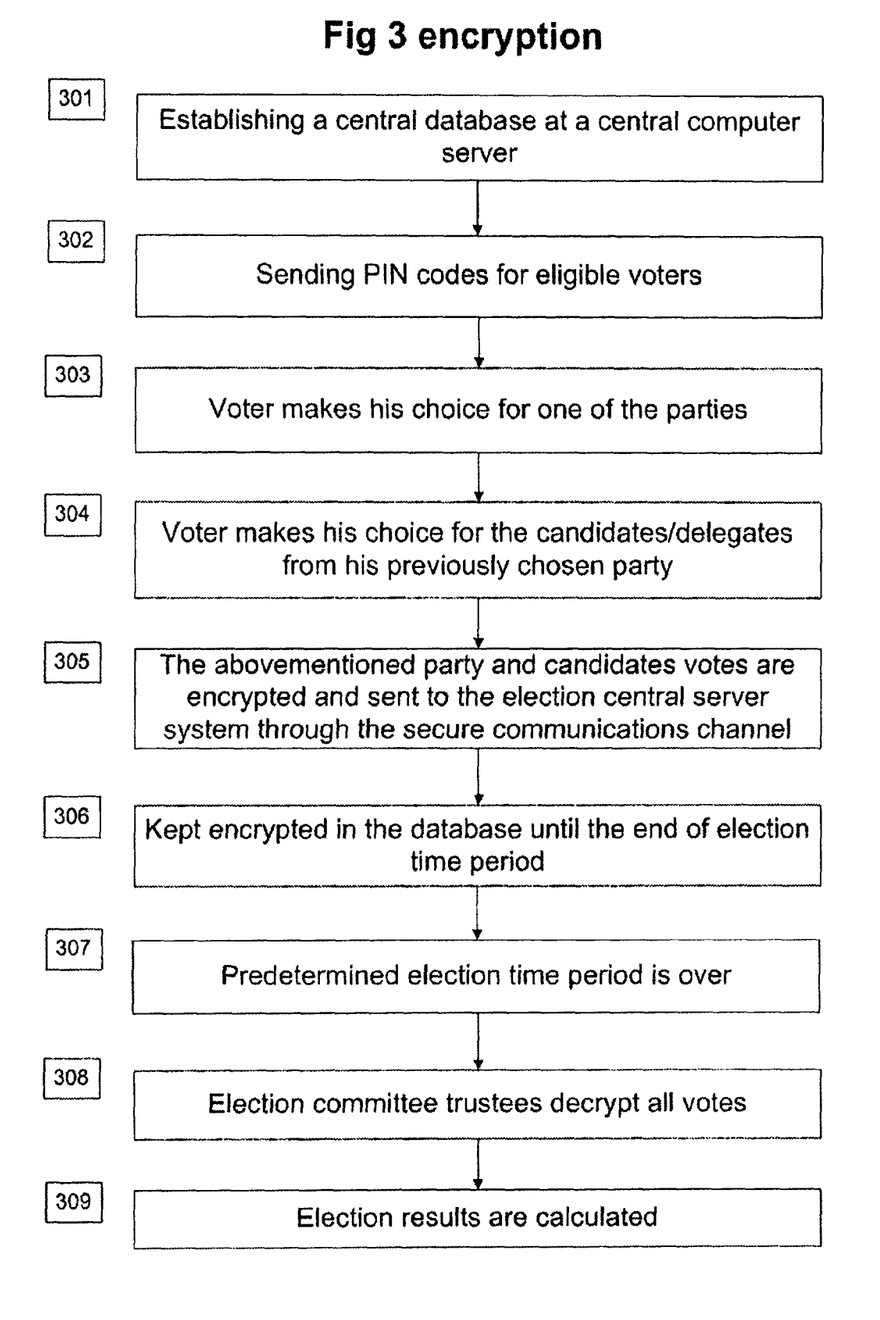
FIG. 3 is a schematic representation of the stages of encryption in remote electronic voting process in the invented system and method.
Figure 5:
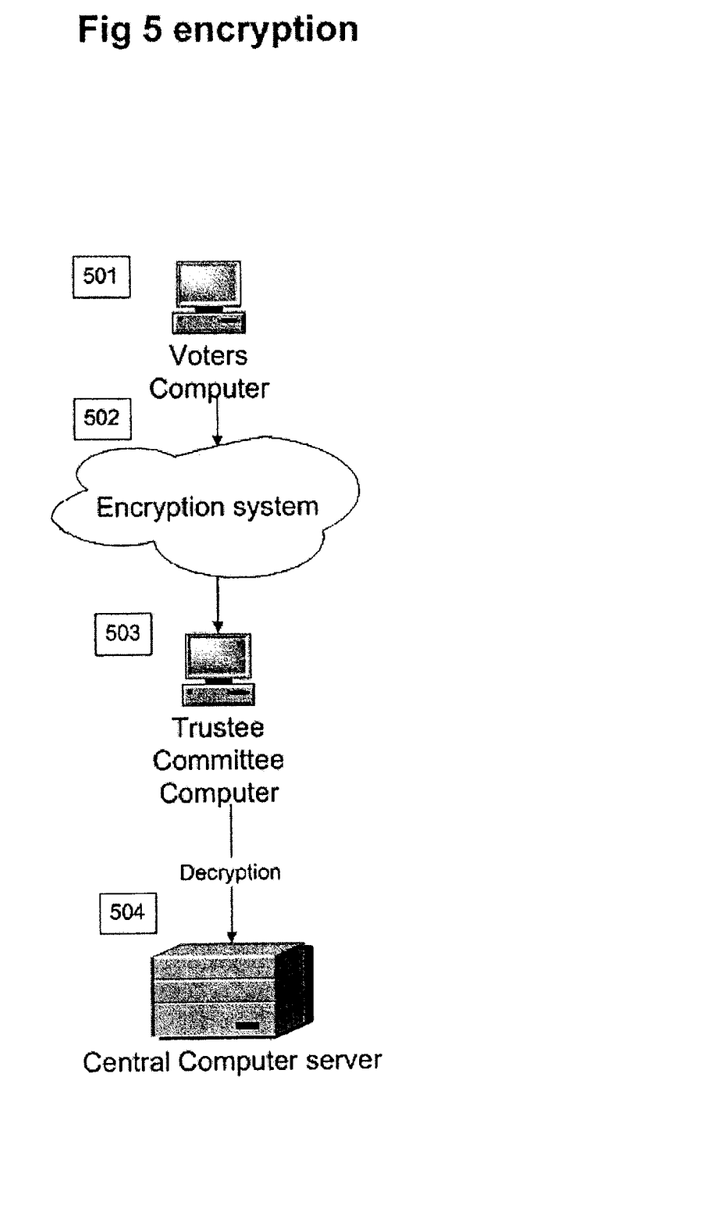
FIG. 5 is a flow chart/block diagram which illustrates operation of an exemplary embodiment of the present invention.

Those are the stages of encryption in remote electronic voting process in the invented system and method as graphically illustrated on FIG. 3 (FIG. 5 is an accompanying flow chart/block diagram):

1. Establishing a central database at a central computer server (301). Encryption process will be performed on such a central computer server, amongst other computers;
2. A special election committee checks voters' eligibility, supervising private and public key generation for the election.

Public key computation in our invention is based on secrete codes of the voter and voting committee trustees respectively. Public key is created for each voter separately and sent her/him via email by election committee.

Sending PIN codes for eligible voters formed from the initial voters list (302);
3. Voter enrolls into the secure voting electronic system using ID, password and PIN code and makes his choice for the particular party (303). Voters who bypass authentication or have already voted are denied access to the ballot;
4. Voter makes his choice on computer 501 for the candidates/delegates from his chosen party in the step above (304)
5. The abovementioned party vote and candidates/delegates votes are sent to the computer encryption system 502 wherein the voting result encryption application is installed for creating a ciphertext data through the secure communications channel (305);
6. The vote will be kept encrypted in the database until the very end of the election time period, where it will be decrypted with trustee committee computer 503 by the election committee trustees (306);
7. Predetermined election time period is over (307);
8. At the end of the election time period, all eligible votes are summarized and the final result is calculated (308);
9. Election committee trustees decrypt all votes (309). Parties' representatives and the voter himself can check on the central voting server 504 through the Internet system, if his vote has been processed or not. If all public calculations are correct, the result of elections is valid and a voter's vote was made into the final result.

Other features and advantages of the present invention will be apparent from the following description taken in conjunction with the accompanying drawings, in which like reference characters designate the same or similar parts throughout the figures thereof.

What is claimed is:

1. An electronic web-based election system for fully encrypted secure remote voting, wherein voting data which corresponds to each voter's vote is fully encrypted until an end of a voting time period, the system comprising:

a) an election central server computer, said election central server computer being configured to:

store voter-related data for each eligible voter;

send to the voter his unique code for registration in a central voting database, said registration includes entering his email address into the voting database;

check for each voter registered in the system for an existing valid email address;

generate a PIN code for each voter registered in the system having said existing valid email address to be able to vote;

send to each voter via regular post mail said PIN code;

send to each voter an email invitation to vote;

authenticate each voter accessing the elections services computer system by authenticating said PIN code and an ID number which is transmitted electronically from each voter to the election central server computer;

send each voter a respective ballot after each voter is authenticated;

generate a public key and a corresponding private key for each voter, respectively, and send said public key to each voter, respectively, obtain votes based on said ballots from each voter in the form of said voting data and store the voting data as a ciphertext in the database, wherein the public key is included with the ciphertext;

calculate elections results from the voting data when the election time period is over;

update election central server system votes results, b) a computer encryption system wherein the voting result encryption application is installed, such a system being configured to receive the votes from each voter in the form of voting data, encrypt the voting data with the public key to obtain encrypted voting data and send such data as ciphertext to the election central server for encrypted ciphertext storage in the database to prevent everybody, including database administrators, from viewing the data, c) a voter computer system which:

opens email or a specially designed secure voting website;

identifies the voter by entering said ID number and said PIN code;

displays a list of parties eligible for elections which is displayed to the voter on a computer screen;

casts the vote by choosing one of the parties from said list of parties;

displays a consolidated list of candidates only from the one of the parties which has been chosen;

casts the vote for candidates by choosing several candidates from the list of available candidates from the one of the parties which has been chosen;

confirms voter choice by at least one of digital signature and entering the PIN code;

receives a notice screen that the vote has been accepted; and encrypting the vote and sending it to the computer encryption;

d) a polling station based system comprised of one of more computers interactively connected to the election central server computer, such computers containing a total list of voters for a polling station, a list of voters who already voted either by using web-based invented system or by using said polling station.

2. The system of claim 1, said election central server computer for sending the PIN code to the voter, by using SMS messaging, to the phone number registered in the elections database.

3. The system of claim 1, wherein the voting is conducted as a poll, when the voting polls participants' number and quality are selected according to statistical sample selection principles.

4. System of claim 1, wherein encrypting and decrypting are performed by performing the steps of
a) creating a public key code for a voter and a private key code for election committee trustees;
b) finding a prime number under minimum of the above codes;
c) finding a prime number over the maximum of the above codes;
d) calculating product of these prime numbers reduced each one by one;
e) computing co-prime number to the above product;
f) founding co-prime number paired with the above product of primes and determining that number to be the public key;
g) generating private key by inversing co-prime number above paired with the same product of the primes;
h) permitting voters to vote and receiving their votes in the form of voting data;
i) encrypting the voting data by multiplying its ASCII code by co-prime of step e above by modulo of its pair;
j) decrypting the data encrypted in step i above by using the created public key and part of the created public key equal to co-prime of step e above, wherein this part of the public key is included in encrypted text as plain first word.

5. Method for secure data encryption and public keys computation based on a secret PIN code sent to a voter by election committee trustees, the method comprising the following steps:
a) creating a public key code for the voter and a private key code for the election committee trustees;
b) finding a prime number under minimum of the above codes;
c) finding a prime number over the maximum of the above codes;
d) calculating product of these prime numbers reduced each one by one;
e) computing co-prime number to the above product;
f) founding co-prime number paired with the above product of primes and determining that number to be the public key;
g) generating private key by inversing co-prime number above paired with the same product of the primes;
h) permitting voters to vote, said vote in the form of voting data;
i) encrypting the voting data by multiplying its ASCII code by co-prime of step e above by modulo of its pair;
j) receiving the encrypted voting data and said public key code;
k) decrypting the data encrypted in step i above by using the created public key and part of the created public key equal to co-prime of step e above, wherein this part of the public key is included in encrypted text as plain first word.

6. Method for full encryption of the election results comprising the steps of:
a) establishing a central database at a central computer server;
b) encrypting voting data corresponding to a vote made by using individual encryption with a public key;
c) sending the encrypted voting data to computer encryption system wherein the voting result encryption application is installed, said system being configured to obtain encrypted voting results data;
d) sending said encrypted voting results data as a ciphertext and the public key to the election central server for encrypted storage in the database to prevent everybody, including database administrators from viewing the data;
e) storing the ciphertext voting data in a database on the election central server until the end of the election time period;
f) decrypting the ciphertext votes data at the end of the election time period done by election committee trustees using their private decryption keys.

7. Method of claim 6, wherein encrypting and decrypting are performed by performing the steps of:

a) creating a public key code for a voter and a private key code for election committee trustees;
b) finding a prime number under minimum of the above codes;
c) finding a prime number over the maximum of the above codes;
d) calculating product of these prime numbers reduced each one by one;
e) computing co-prime number to the above product;
f) founding co-prime number paired with the above product of primes and determining that number to be the public key;
g) generating private key by inversing co-prime number above paired with the same product of primes;
h) permitting voters to vote and receiving their votes in the form of voting data;
i) encrypting the voting data by multiplying its ASCII code by co-prime of step e above by modulo of its pair;
j) decrypting the data encrypted in step i above by using the created public key and part of the created public key equal to co-prime of step e above, wherein this part of the public key is included in encrypted text as plain first word.

8. System for full encryption of the election results comprising:
   a) elections central computer server configured by a program to transmit a selected vote over a data transmission network to an election authority responsive to a secret code;
   b) a key generator for generating and sending a public key to each voter;
   c) at least one processor for encrypting voting data corresponding to the vote with the public key, sending the encrypted voting data to a computer encryption system having a voting result encryption application which obtains encrypted voting results data; and
   d) sending the encrypted voting results data as a ciphertext and said public key to the election central server for encrypted storage in the database to prevent everybody, including database administrators from viewing the data; and
   decrypting the ciphertext votes data at the end of the election time period by election committee trustees using their private decryption keys.

9. System of claim 8, wherein encrypting and decrypting are performed by performing the steps of:
   a. creating a public key code for a voter and a private key code for election committee trustees;
   b) finding a prime number under minimum of the above codes;
   c) finding a prime number over the maximum of the above codes;
   d) calculating product of these prime numbers reduced each one by one;
   e) computing co-prime number to the above product;
   f) founding co-prime number paired with the above product of primes and determining that number to be the public key;
   g) generating private key by inversing co-prime number above paired with the same product of the primes;
   h) permitting voters to vote and receiving their votes in the form of voting data;
   i) encrypting the voting data by multiplying its ASCII code by co-prime of step e above by modulo of its pair;
   j) decrypting the data encrypted in step i above by using the created public key and part of the created public key equal to co prime of step e above, wherein this part of the public key is included in encrypted text as plain first word.

\* \* \* \* \*